US008757817B2

(12) United States Patent
Hewlett et al.

(10) Patent No.: US 8,757,817 B2
(45) Date of Patent: Jun. 24, 2014

(54) ILLUMINATION OBSCUREMENT DEVICE WITH TWO SEPARATE LIGHT CELL ARRAYS THAT PRODUCES A SHAPED BEAM OF LIGHT AS OUTPUT

(75) Inventors: William Hewlett, Derby (GB); Nigel Evans, West Midlands (GB)

(73) Assignee: Production Resource Group, LLC, New Windsor, NY (US)

( * ) Notice: Subject to any disclaimer, the term of this patent is extended or adjusted under 35 U.S.C. 154(b) by 157 days.

(21) Appl. No.: 13/191,277

(22) Filed: Jul. 26, 2011

(65) Prior Publication Data

US 2011/0280022 A1 Nov. 17, 2011

Related U.S. Application Data

(60) Continuation of application No. 12/538,625, filed on Aug. 10, 2009, now Pat. No. 7,985,007, which is a division of application No. 11/864,388, filed on Sep. 28, 2007, now Pat. No. 7,572,035, which is a division of application No. 11/339,333, filed on Jan. 24, 2006, now Pat. No. 7,585,093, which is a continuation of application No. 10/400,045, filed on Mar. 25, 2003, now Pat. No. 6,988,817, which is a continuation of application No. 09/724,588, filed on Nov. 28, 2000, now Pat. No. 6,536,922, which is a division of application No. 09/711,355, filed on Nov. 9, 2000, now Pat. No. 6,601,974, which is a division of application No. 09/108,263, filed on Jul. 1, 1998, now Pat. No. 6,220,730.

(51) Int. Cl.
*G03B 21/14* (2006.01)

(52) U.S. Cl.
USPC ............ 353/97; 362/276; 362/277; 362/282; 362/297; 362/303

(58) Field of Classification Search
USPC ........ 353/88, 89, 90, 91, 92, 93, 97; 362/257, 362/276, 277, 282, 297, 300, 303
See application file for complete search history.

(56) References Cited

U.S. PATENT DOCUMENTS 1,865,186 A 6/1932 Harris, Jr.
4,257,086 A 3/1981 Gulliksen
4,890,208 A 12/1989 Izenour
5,188,452 A 2/1993 Ryan
5,371,559 A * 12/1994 San-Nohe et al. .............. 353/31
5,379,083 A * 1/1995 Tomita .......................... 353/122
5,418,546 A 5/1995 Nakagakiuchi et al.
5,541,679 A 7/1996 Yang
5,597,223 A * 1/1997 Watanabe et al. ............... 353/97

(Continued)

*Primary Examiner* — Francis M Legasse, Jr.
*Assistant Examiner* — Bao-Luan Le
(74) *Attorney, Agent, or Firm* — Law Office of Scott C. Harris, Inc.

(57) ABSTRACT

An illumination obscurement device for controlling the obscurement of illumination from a light source which is optimized for use with a rectangular, arrayed, selective reflection device. In a preferred embodiment, a rotatable shutter with three positions is placed between a light source and a DMD. The first position of the shutter is a mask, preferably an out of focus circle. This out of focus circle creates a circular mask and changes any unwanted dim reflection to a circular shape. The second position of the shutter is completely open, allowing substantially all the light to pass. The third position of the shutter is completely closed, blocking substantially all the light from passing. By controlling the penumbra illumination surrounding the desired illumination, DMDs can be used in illumination devices without creating undesirable rectangular penumbras.

2 Claims, 11 Drawing Sheets

(56) References Cited

U.S. PATENT DOCUMENTS

| | | | | |
|---|---|---|---|---|
| 5,622,418 | A * | 4/1997 | Daijogo et al. | 353/97 |
| 5,629,801 | A | 5/1997 | Staker et al. | |
| 5,633,755 | A | 5/1997 | Manabe et al. | |
| 5,668,611 | A | 9/1997 | Ernstoff et al. | |
| 5,868,482 | A | 2/1999 | Edlinger et al. | |
| 5,924,783 | A * | 7/1999 | Jones | 353/97 |
| 5,957,560 | A | 9/1999 | Do et al. | |
| 6,220,730 | B1 * | 4/2001 | Hewlett et al. | 362/297 |
| 6,246,450 | B1 | 6/2001 | Inbar | |
| 6,309,074 | B1 | 10/2001 | Inbar et al. | |
| 6,356,700 | B1 | 3/2002 | Strobl | |
| 6,483,641 | B1 | 11/2002 | MacAulay | |
| 6,536,922 | B1 * | 3/2003 | Hewlett et al. | 362/290 |
| 6,601,974 | B1 * | 8/2003 | Hewlett et al. | 362/297 |
| 6,988,817 | B2 * | 1/2006 | Hewlett et al. | 362/321 |
| 7,572,035 | B2 * | 8/2009 | Hewlett et al. | 362/325 |
| 7,585,093 | B2 * | 9/2009 | Hewlett et al. | 362/321 |
| 2008/0019135 | A1 * | 1/2008 | Hewlett et al. | 362/297 |
| 2011/0280022 | A1 * | 11/2011 | Hewlett et al. | 362/296.09 |

* cited by examiner

ILLUMINATION OBSCUREMENT DEVICE WITH TWO SEPARATE LIGHT CELL ARRAYS THAT PRODUCES A SHAPED BEAM OF LIGHT AS OUTPUT

CROSS-REFERENCE TO RELATED APPLICATIONS

This application is a divisional of U.S. application Ser. No. 11/339,333, filed Jan. 24, 2006; which is a continuation of U.S. application Ser. No. 10/400,045, filed Mar. 25, 2003 (now U.S. Pat. No. 6,988,817); which is a continuation of U.S. application Ser. No. 09/724,588, filed Nov. 28, 2000 (now U.S. Pat. No. 6,536,922); which is a divisional of U.S. application Ser. No. 09/711,355, filed Nov. 9, 2000 (now U.S. Pat. No. 6,601,974); which is a divisional of U.S. application Ser. No. 09/108,263, filed Jul. 1, 1998 (now U.S. Pat. No. 6,220,730).

TECHNICAL FIELD

The present disclosure describes a special image obscurement device for a light source.

BACKGROUND

In live dramatic performances controlled lighting is often used to illuminate a performer or other item of interest. The illuminated area for live dramatic performance is conventionally a circular beam of light called a "spot light." This spot light has been formed from a bulb reflected by a spherical, parabolic, or ellipsoidal reflector. The combination forms a round beam due to the circular nature of reflectors and lenses.

The beam is often shaped by gobos. FIG. 1 shows a light source 100 with reflector 101 projecting light through a triangular gobo 108 to the target 105. The metal gobo 108 as shown is a sheet of material with an aperture 110 in the shape of the desired illumination. Here, that aperture 110 is triangular, but more generally it could be any shape. The gobo 108 restricts the amount of light which passes from the light source 100 to the imaging lenses 103. As a result, the pattern of light 106 imaged on the stage 105 conforms to the shape of the aperture 110 in the gobo 108.

Light and Sound Design, the assignee of this application, have pioneered an alternate approach of forming the gobo from multiple selected reflective silicon micromirrors. One such array is called a digital mirror device ("DMD") where individual mirrors are controlled by digital signals. See U.S. Pat. No. 5,828,485 the disclosure of which are herein incorporated by reference. DMDs have typically been used for projecting images from video sources. Because video images are typically rectangular, the mirrors of DMDs are arranged in a rectangular array of rows and columns.

The individual mirrors 370 of a DMD are rotatable. Each mirror is mounted on a hinge 372 such that it can rotate in place around the axis formed by the hinge 372. Using this rotation, individual mirrors 370 can be turned "on" and "off" to restrict the available reflective surface.

FIG. 2 shows an example of using a DMD 400 to project a triangular illumination by turning "off" some of the mirrors in the DMD 400. The surface of the DMD 400 exposed to a light source 402 comprises three portions. The individual mirrors which are turned "on" (toward the light source 402) make up an active portion 404. In FIG. 3A, the active portion 404 is triangular. The individual mirrors which are turned "off" (away from the light source 402) make up an inactive portion 406. These pixels are reflected. The third portion is a surrounding edge 408 of the DMD 400. Each of these portions of the DMD 400 reflects light from the light source 402 to different degrees.

FIG. 3A shows a resulting illumination pattern 410 with the active area 404 inactive area 406 and cage 408.

SUMMARY

The inventors recognize that light reflected from the inactive portion 406 of the DMD 400 generates a dim rectangular penumbra 418 area surrounding the bright desired area 404. Light reflected from the edge 408 of the DMD 400 generates a dim frame area. The inventors recognized that this rectangular penumbra 418 is not desirable.

The inventors also recognized that a circular penumbra is much less noticeable in the context of illumination used in dramatic lighting.

Accordingly the inventors have determined that it would be desirable to have a device which would provide a circular illumination without a rectangular penumbra while using a rectangular arrayed device as an imaging surface. The present disclosure provides such capabilities.

This disclosure describes controlling illumination from a light source. The disclosed system is optimized for use with a rectangular, arrayed, selective imaging device.

In a preferred embodiment, a rotatable shutter with three positions is placed between a DMD and the imaging optical system. The first position of the shutter is a mask, preferably a circle, placed at a point in the optical system to be slightly out of focus. This circle creates a circular mask and changes any unwanted dim reflection to a circular shape. The second position of the shutter is completely open, allowing substantially all the light to pass. The third position of the shutter is completely closed, blocking substantially all the light from passing.

An alternate embodiment for blocking the rectangular penumbra by changing any penumbra to round uses an iris shutter placed between a DMD and increases optics. The iris shutter creates a variable aperture which ranges from completely closed to completely open. Intermediate settings include circles of varying diameter, resulting in similar projections as with the first position of the shutter embodiment.

Another alternate embodiment for blocking the rectangular penumbra by changing any penumbra to round uses two reflective surfaces. The first reflective surface is a DMD. The second reflective surface is preferably a light-sensitive reflective surface such as a polymer. If the light striking a portion of the reflective surface is not sufficiently bright, that portion will not reflect the full amount of that light.

By controlling the penumbra illumination surrounding the desired illumination, DMDs and other pixel-based rectangular elements can be used in illumination devices without creating undesirable rectangular penumbras.

DETAILED DESCRIPTION

The structure and operational parameters of preferred embodiments will be explained below making reference to the drawings.

The present system uses two different operations to minimize the viewable effect of the unintentional illumination, or penumbra, discussed previously. A first operation forms the optics of the system in a way which prevents certain light from being focused on the DMD and hence prevents that light from being reflected. By appropriately masking the incoming light to the DMD, certain edge portions of the penumbra can be masked. A second part of the system uses a special illumination shutter to provide different shaped penumbras when desired.

Figure 4:
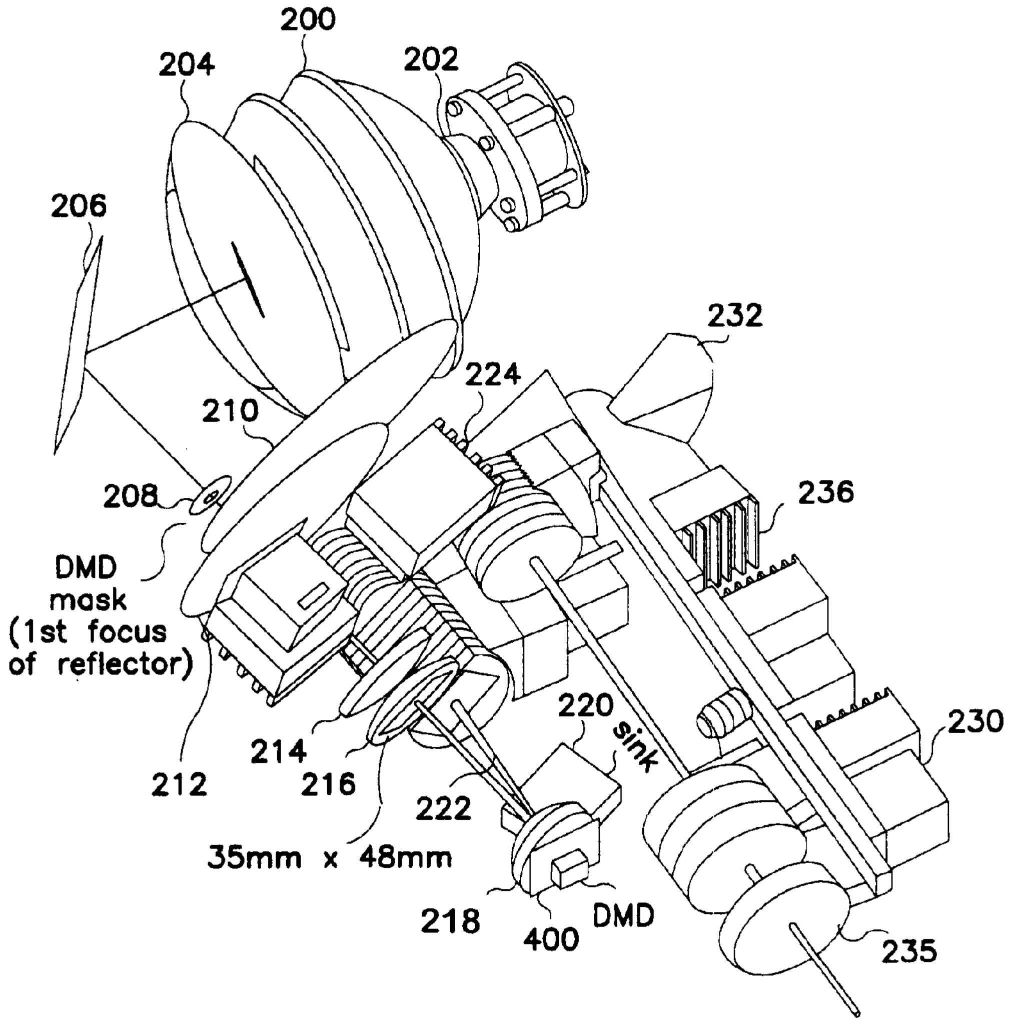
FIG. 4 show the optical train.

The overall optical system is shown in FIG. 4. The bulb assembly 200 includes a high wattage bulb, here an MSR 1200 SA Xenon bulb 202 and retroreflectors 204 which capture some of the output from that bulb. The output of the bulb is coupled to a dichroic or "cold" mirror 206 which reflects the visible light while passing certain portions of the infrared. The first focus of the reflector is at Point 208. A DMD mask is located at that point. The DMD mask is preferably rectangular, and substantially precisely the shape of the inner area 418 of the DMD. The image of the mask is also focused onto the DMD: such that if one were looking at the mask from the position of the DMD, one would see the mask clearly and in focus.

A first color system includes an RGB system 210 and a parameter color system 212. The light passes through all of these elements and is then further processed by an illumination relay lens 214 and then by an imaging relay lens 216. The image relay lens 216 has an aperture of 35 millimeters by 48 millimeters. The output is focused through a field lens 218 to the DMD 400. The off pixels are coupled to heat sink 220, and the on pixels are coupled via path 222 back through the imaging relay 216 folded in the further optics 224 and finally coupled to zoom elements 230. The zoom elements control the amount of zoom of the light beam. The light is colored by a designer color wheel 232 and finally focused by a final focus element 235 controlled by motor assembly 236.

The way in which the outer penumbra is removed will be explained with reference to FIGS. 3A and 8B.

Figure 1:
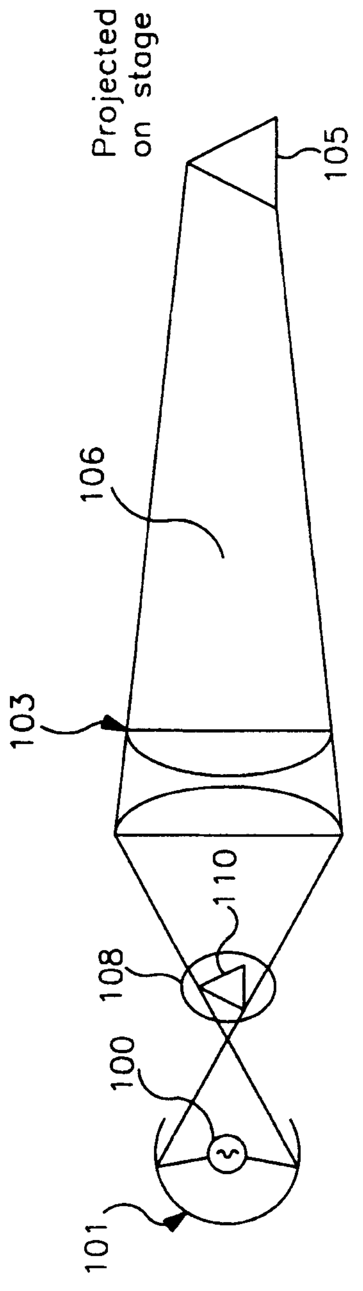
FIG. 1 shows a conventional illumination device including a gobo.
Figure 2:
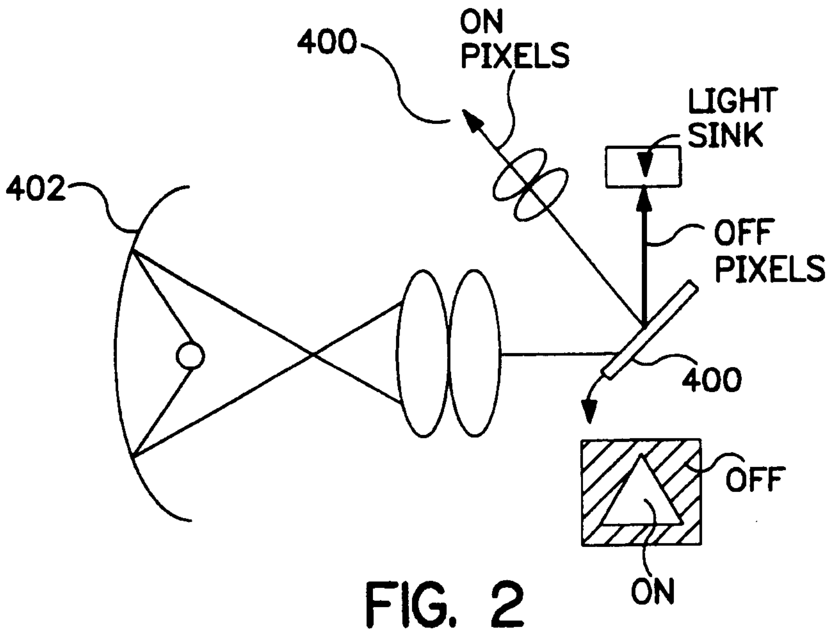
FIG. 2 PRIOR ART
FIG. 2 shows an illumination device including a DMD.
Figure 3A:
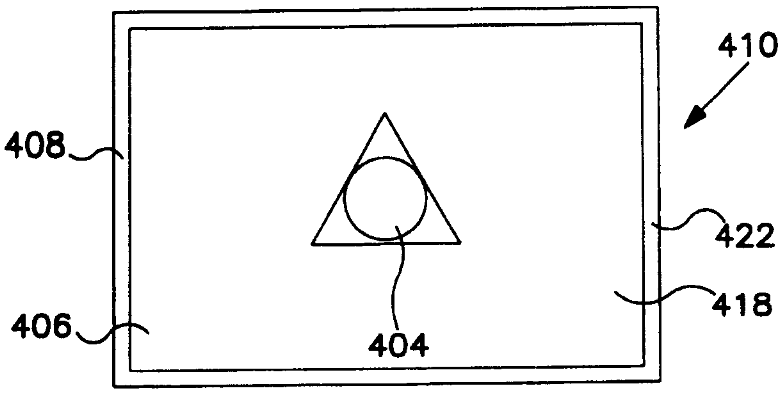
FIG. 3A PRIOR ART
FIGS. 3A-3G shows a illumination patterns.
Figure 3B:
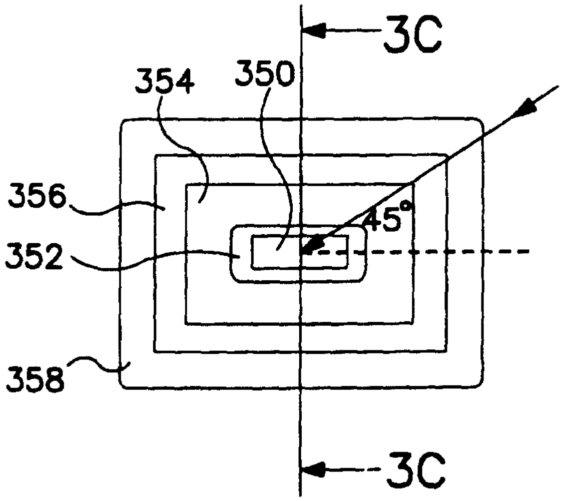

FIG. 3B shows the front surface of the DMD. This includes a relatively small inner active portion 350 which includes the movable mirrors. Active portion 350 is surrounded by a white inactive portion 352 which is surrounded by packaging portion 354, a gold package 356, and a ceramic package 358. Light is input at a 20° angle from the perpendicular. The reason why becomes apparent when one considers FIG. 3C. The mirrors in the DMD tip by 10°.

Figure 3C:
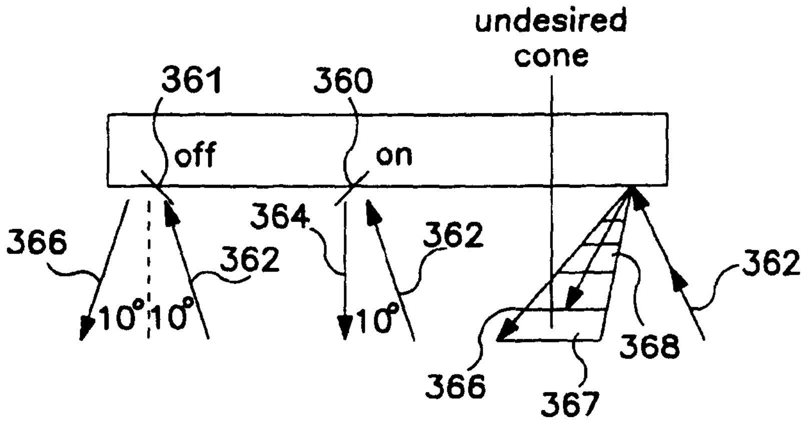

FIG. 3C shows two exemplary mirrors, one mirror 360 being on, and the other mirror 361 being off. Input light 362 is input at a 20° angle. Hence, light from the on mirror emerges from the DMD perpendicular to its front surface shown as 364. However, the same light 362 impinging on an off mirror emerges at a different angle shown as 366. The difference between those two angles forms the difference 367 between undesired light and desired light. However, note in FIG. 3C what happens when the incoming light 362 hits a flat surface. Note the outgoing beam 368 is at a different angle than either the off position or the on position. The hypothetical beam 366 from an off mirror is also shown.

Figure 3D:
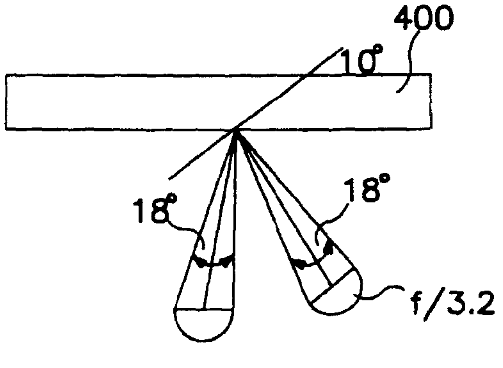

The inventors recognize, therefore, that a lot of this information falls within an undesired cone of light. All light which is input (e.g. 362 rays) can be filtered by removing the undesired cone. This is done according to the present disclosure by stopping down the cone of light to about 18° on each side. The final result is shown in FIG. 3D. The incoming light is stopped down to a cone of 18° by an F/3.2 lens. The incoming light is coupled to the surface of the DMD 400, and the outgoing light is also stopped to a cone of 18°. These cones in the optical systems are identified such that the exit cone does not overlap with the undesired cone 367 shown in FIG. 3C.

Figure 3E:
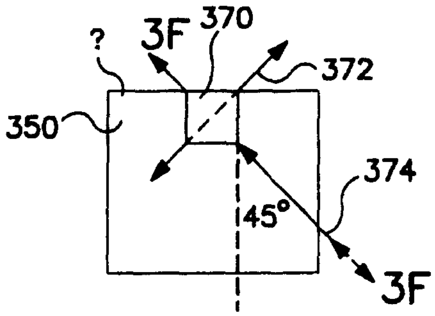
Figure 3F:
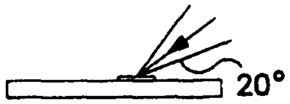
Figure 3G:
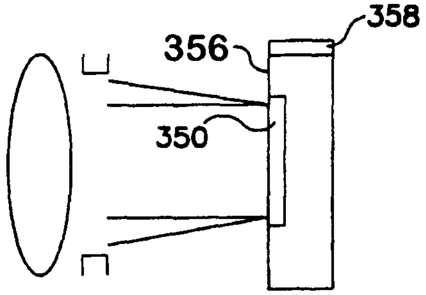

This operation is made possibly by appropriate two-dimensional selection of the incoming light to the digital mirror. FIG. 3E shows the active portion 350 of the digital mirror. Each pixel is a rectangular mirror 370, hinged on axis 372. In order to allow use of this mirror and its hinge, the light needs to be input at a 45° angle to the mirror, shown as incident light ray 374. The inventors recognized, however, that light can be anywhere on the plane defined by the line 374 and perpendicular to the plane of the paper in FIG. 3E. Hence, the light of this embodiment is input at the FIG. 3F which represents a cross section along the line 3E-3F. This complex angle enables using a plane of light which has no interference from the undesired portions of the light. Hence, by using the specific desired lenses, reflections of random scattered illumination is bouncing off the other parts is removed. This masking carried out by at least one of the DMD mask 208 and the DMD lens 218. By appropriate selection of the input light, the output light has a profile as shown in FIG. 3G. 350 represents the DMD active area, 356 represents the package edge, and 358 represents the mount. The light output is only from the DMD active area and is stopped and focused by appropriate lenses as shown in FIG. 3G.

Figure 5:
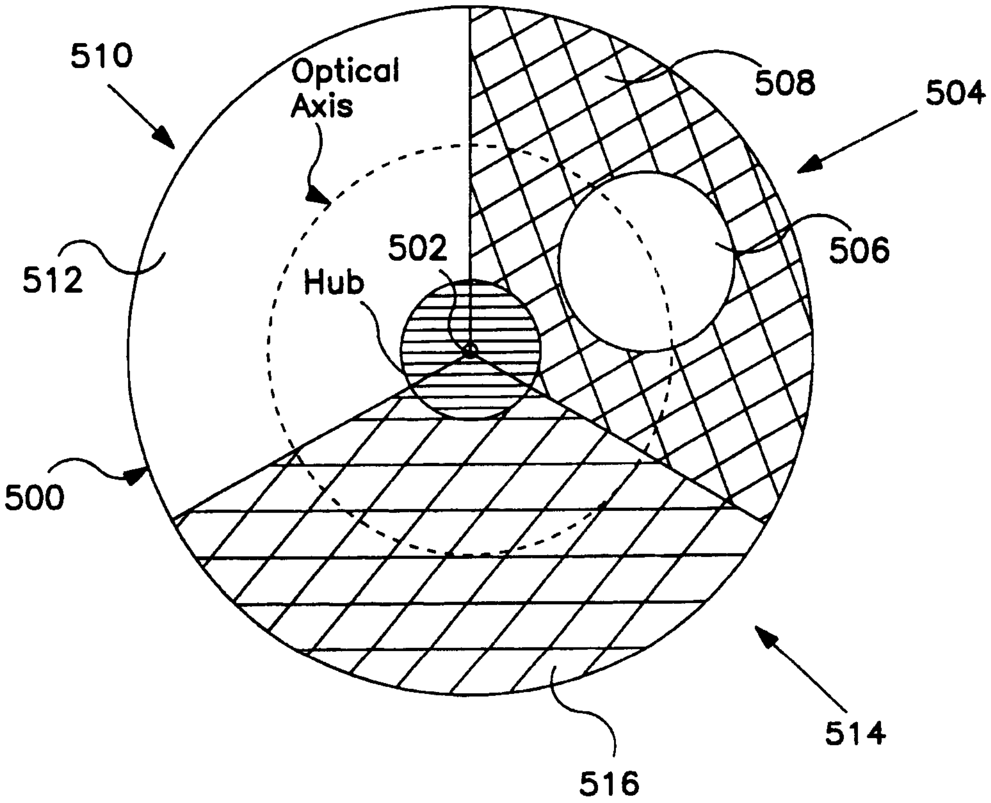
FIG. 5 shows a three position shutter according to a preferred embodiment of the present invention.

FIG. 5 shows a planar view of a shutter 500 according to a preferred embodiment of the invention. The preferred configuration of the shutter 500 is a disk divided into three sections. Each section represents one position to which the shutter 500 may be set. The shutter 500 is preferably rotated about the center point 502 of the shutter. The gate of the light is off center, to allow it to interact with one of the three sections. Rotation is preferred because rotation allows efficient transition between positions. Alternately, the shutter 500 may slide vertically or horizontally to change from one position to another. A round shape is preferred because of efficiency in material and space use. Alternately, the shutter 500 may be rectangular or some other polygonal shape.

Three positions are preferred because each position is rotatably equidistant from the other positions. However, a shutter 500 with three positions provides more positions than a shutter 500 with only two positions.

In a preferred embodiment, a first position is a mask position 504. The mask position 504 includes an open or transparent aperture 506 and an opaque mask portion 508 which is not permeable to light. Preferably, material is removed from the shutter 500 leaving a shaped aperture 506 and a mask portion 508.

The second position is an open position 510. The open position 510 includes an opening 512. Preferably the opening 512 is formed by removing substantially all material from the shutter 500 in the section of the open position 510.

The third position is a closed position 514. The closed position 514 includes a opaque barrier portion 516. Preferably, the barrier portion 516 is just a solid block of material.

Figure 6A:
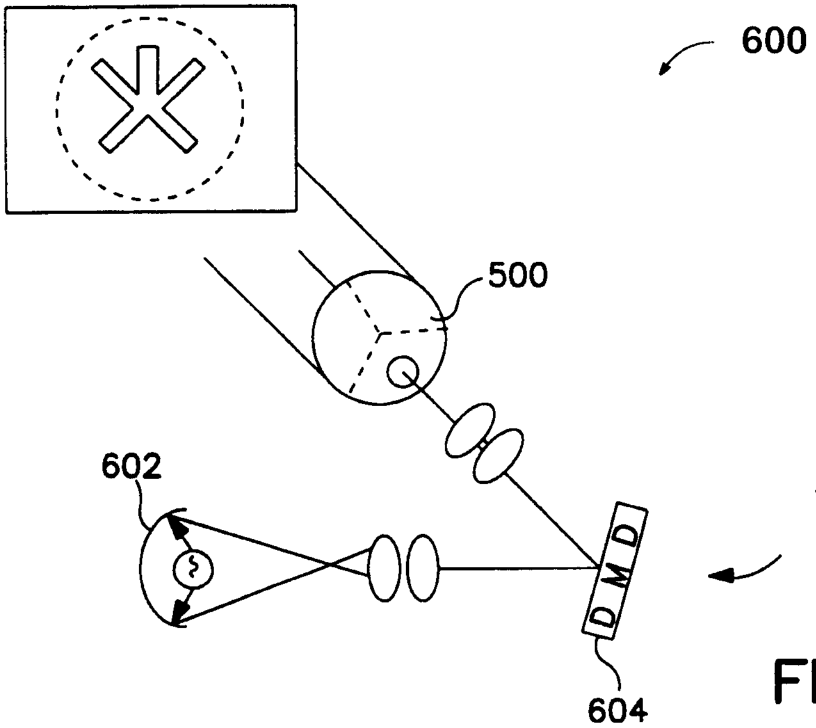
FIG. 6A shows an illumination device including a three position shutter according to a preferred embodiment of the present invention which is set to a mask position.

FIG. 6A shows a preferred embodiment of an illumination system. A shutter 500 of the type shown in FIG. 5 is rotatably mounted between a light source 602/DMD 604 such that substantially all the light from the light source 602 strikes only one section of the shutter 500 at a time. The shutter 500 is rotatably positioned to the mask position 504. Thus, when the light source 602 is activated, light from the light source 602 reflected by DMD 604 strikes only the mask position 504 of the shutter 500.

Using digital control signals, the DMD 604 is set so that an active portion 404 of the individual mirrors are turned "on" and an inactive portion 406 of the individual mirrors are turned "off" (see FIG. 3A). The shape of the active portion 404 is set to conform to the desired shape of the bright portion of the illumination reflected by the DMD 604 shown in FIG. 6B, described below.

Figure 6B:
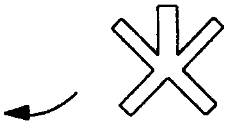
FIG. 6B shows an illumination pattern resulting from the device shown in FIG. 6A.

FIG. 6B shows an illumination pattern generated by the illumination device 600 configured as shown in FIG. 6A.

Returning to FIG. 3A and 3B, when the shutter 500 is not interposed between the DMD 400 and the stage. All portions of the DMD 400 reflect the light and create the undesirable illumination pattern shown in FIG. 3A. In particular, the bright triangular area 404 is surrounded by an undesirable dim rectangular penumbra 418 and slightly brighter frame 422.

As described above, the illumination pattern shown in FIG. 6B does not include a dim rectangular penumbra 418 and a slightly brighter frame 422. These undesirable projections are substantially eliminated by using the shutter 500 and the aperture 506. A dim penumbra illumination is generated by light reflecting from the inactive portion of the DMD 604. This dim circular penumbra illumination is more desirable than the dim rectangular penumbra and slightly brighter frame 422 of FIG. 3A because the shape of the dim penumbra illumination is controlled by the shape of the aperture 506. Accordingly, the dim penumbra illumination can be conformed to a desirable shape.

Figure 7:
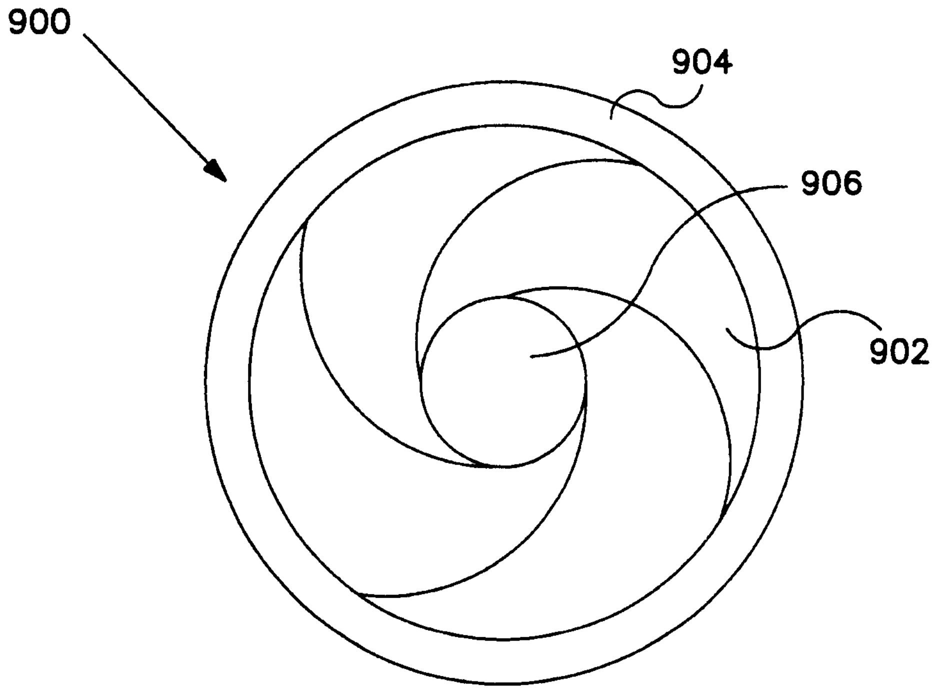
FIG. 7 shows an iris-type shutter.

FIG. 7 shows an alternate embodiment for an iris shutter 900. Preferably, a series of opaque plates 902 are arranged inside a ring 904 to form an iris diaphragm. By turning the ring 904 the plates 902 move so that an iris aperture 906 in the center of the iris shutter 900 varies in diameter. The iris aperture 906 preferably varies from closed to a desired maximum open diameter. Preferably the iris shutter 900 can transition from closed to a maximum diameter (or the reverse) in 0.1 seconds or less.

Figure 8A:
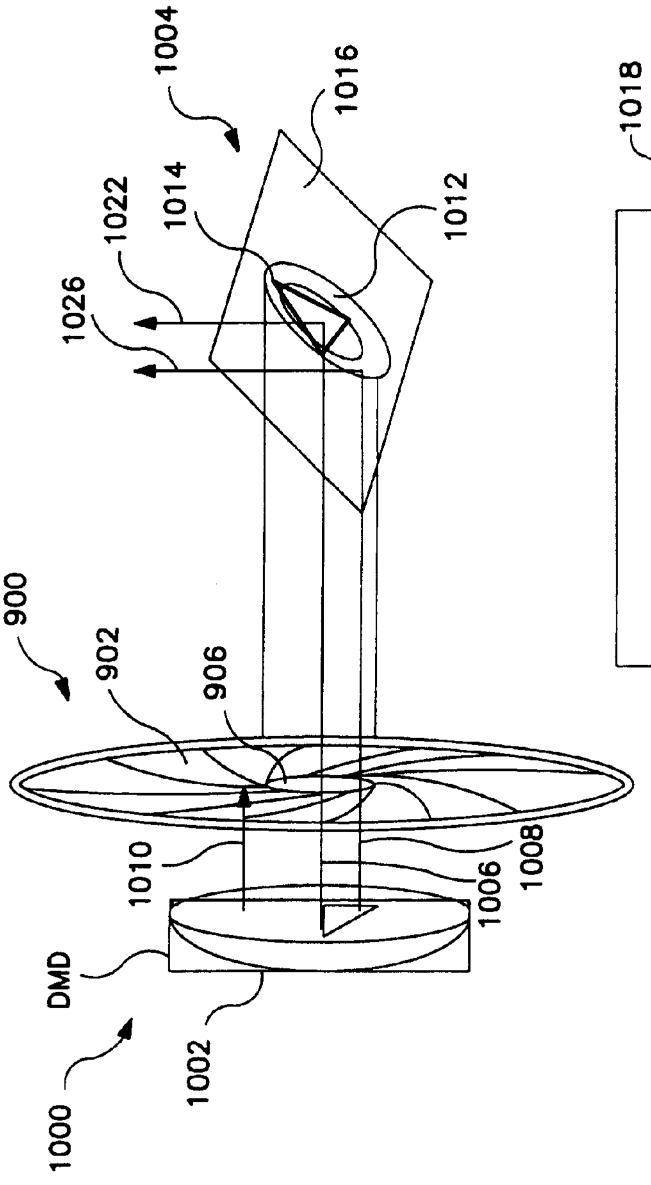
FIGS. 8A and 8B show use of the adjustable iris in a DMD system.

FIG. 8A shows an illumination device 1000 including an iris shutter 900 as shown in FIG. 7. The iris shutter 900 is positioned between a DMD 1004 and a stage 1002. In FIG. 8A, the iris shutter 900 is partially open such that the iris aperture 906 allows part of the light 1006, 1008 from the light source 1002 to pass through, similar to the mask position 504 of the three position shutter 500 shown in FIG. 5. One difference between the mask position 504 and the iris shutter 900 is that the iris aperture 906 is variable in diameter while the aperture 506 of the mask position 504 is fixed. The remainder of the light 1010 from the light source 1002 is blocked by the plates 902 of the iris shutter 900. The light 1006, 1008 which passes through the iris aperture 906 strikes the DMD 1004 in a pattern 1012 which is the same shape as the shape of the iris aperture 906. Through digital control signals, some of the individual mirrors of the DMD 1004 are turned "on" to form an active portion 1014, and some of the individual mirrors are turned "off" to form an inactive region 1016. Preferably, the pattern 1012 is at least as large as the active portion 1014 of the DMD.

Figure 8B:
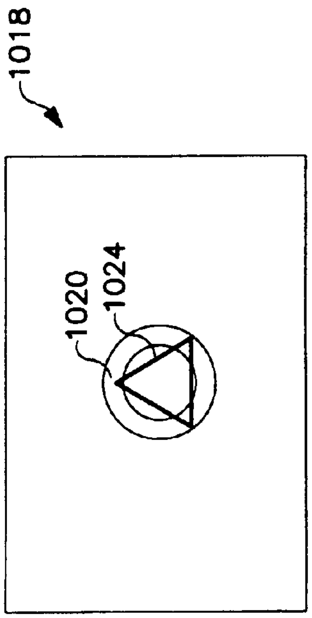

FIG. 8B shows an illumination pattern 1018 generated by the illumination device 1000 shown in FIG. 8A. Similar to FIG. 6A and 6B, a bright illumination 1020 is generated by light 1022, 1020 reflected from the active portion 1014 of the DMD 1004. A dim penumbra illumination 1024 is generated by light 1026 reflected from the inactive portion 1016 of the DMD 1004. By varying the diameter of the iris aperture 906, the size of the pattern 1012 on the DMD 1004 changes. As the pattern 1012 changes the amount of the inactive portion 1016 of the DMD 1004 which is struck by light 1008 from the light source 1002 changes and so the dim penumbra 1024 changes as well.

Figure 9:
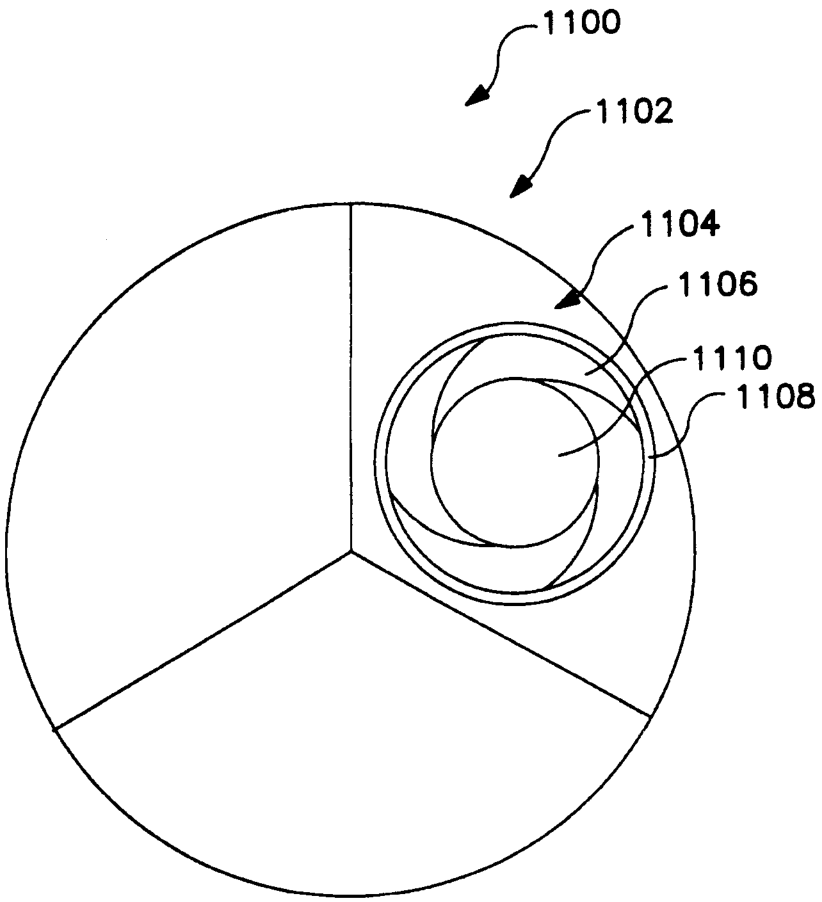
FIG. 9 shows a three-position shutter with an iris system.

FIG. 9 shows an alternate embodiment of a shutter 1100 which combines features of a three position shutter 500 with an iris shutter 900. The overall configuration of this shutter 1100 is that of the three position shutter 500. However, instead of the mask portion 504 as shown in FIG. 5 and FIG. 6A, one of the positions is an iris portion 1102. The iris portion 1102 has an iris diaphragm 1104 inserted into the material of the shutter 1100. Similar to the iris shutter 900 of FIG. 7, the iris diaphragm 1104 is made from a series of opaque plates 1106 arranged inside a ring 1108. By turning the ring 1108 the plates 1106 move so that an iris aperture 1110 in the center of the iris diaphragm 1104 varies in diameter. This configuration operates in most respects similarly to the three position shutter 500 as shown in FIG. 5 and FIG. 6A. Because of the iris diaphragm 1104, the amount of light blocked by the iris portion 1102 is variable.

Figure 10:
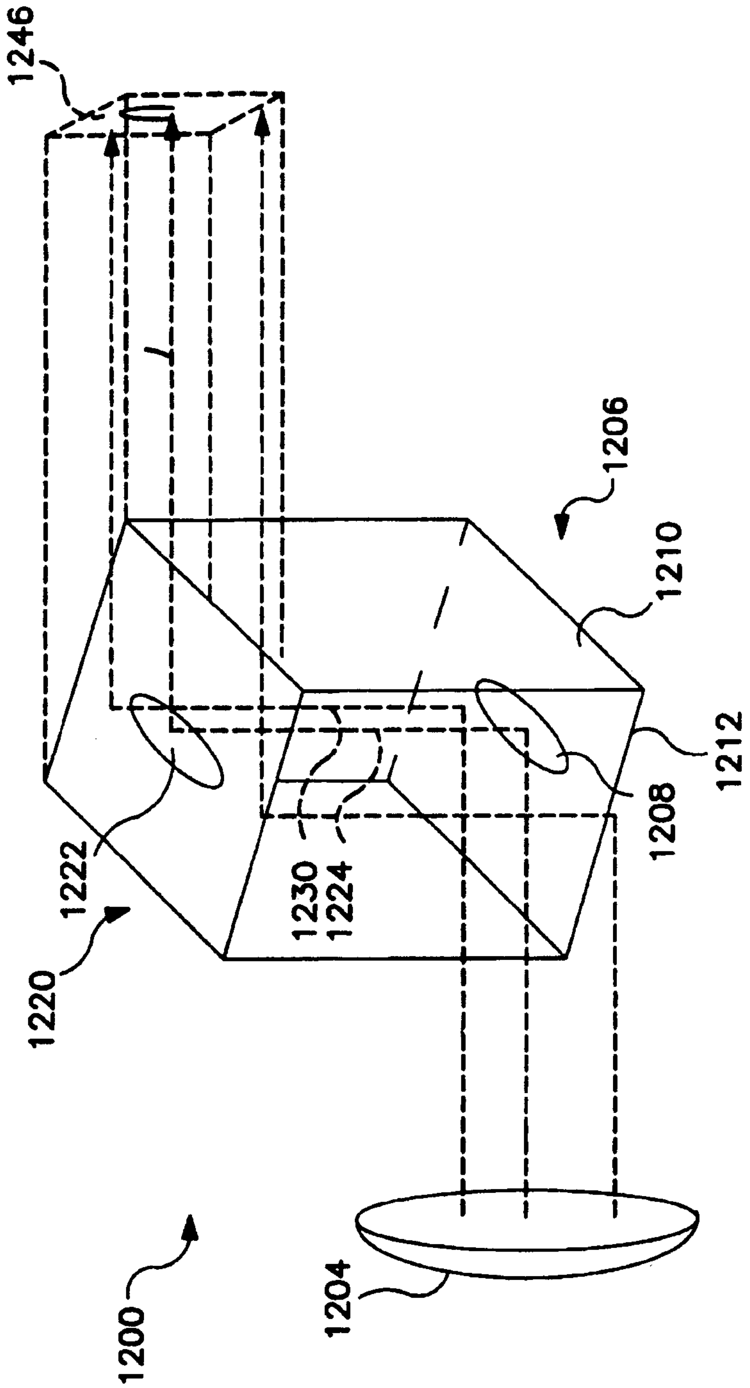
FIG. 10 shows an embodiment with a light.

FIG. 10 shows an alternate embodiment of an illumination device 1200 which includes a second reflective surface 1220. A light source 1204 projects light onto a DMD 1206 which has an active portion 1208 and an inactive portion 1210. Light reflects off the DMD 1206 and strikes the second reflective surface 1220. The second reflective surface 1220 acts to reduce the dim penumbra and frame created by the inactive 1210 and edge 1212 of the DMD 1206 (recall FIG. 3A and 3B), leaving the active portion 1222, to project image 1246.

In the embodiment shown in FIG. 10, the second reflective surface 1220 is a light sensitive surface such as an array of light trigger cells. Only light of a certain brightness is reflected. If the light striking a cell is insufficiently bright, substantially no light is reflected by that cell. Alternately, the second reflective surface 1220 may be made of a polymer material that only reflects or passes light of sufficient brightness. Light 1224 reflected from the active portion 1208 of the DMD 1206 is preferably bright enough to be reflected from the second reflective surface 1220. Light 1230 reflected from the inactive portion 1210 and the edge 1212 of the DMD 1206 is preferably not bright enough to be reflected from the second reflective surface 1220. Thus, only light 1224 from the active portion 1208 of the DMD 1206 will be reflected from the second reflective surface 1220. As described above, the undesirable dim rectangular penumbra 418 and slightly brighter frame 422 (recall FIG. 3A) would be created by light 1230 reflected from the inactive portion 1210 and edge 1212 of the DMD 1206. The second reflective surface 1220 does not reflect this dim light 1230 and so wholly eliminates the dim penumbra and frame from the resulting illumination.

A number of embodiments of the present invention have been described which provide controlled obscurement of illumination. Nevertheless, it will be understood that various modifications may be made without departing from the spirit and scope of the invention. For example, filters or lenses might be introduced to the illumination device 600 shown in FIG. 6A between the shutter 500 and the DMD 604. Alternately, the light source might be a video projection device or a laser.

While this disclosure describes blocking the light before impinging on the DMD, it should be understood that this same device could be used anywhere in the optical train, including downstream of the DMD. Preferably the blocking is at an out of focus location to soften the edge of the penumbra, but could be in-focus.

The light reflecting device could be any such device, including a DMD, a grating light valve ("GLV"), or any other arrayed reflecting device which has a non-circular shape.

All such modifications are intended to be encompassed in the following claims.

What is claimed is:

1. A lighting device, comprising:

a light source producing a light beam;

an array of light controlling elements, which is adjustable in response to a control signal, and which are intended to be placed in a path of said light beam, said array being formed in a rectangular shape, and said array producing a shaped light beam which is shaped to have a desired outer perimeter shape based on said control signal; and an illumination output element, located optically downstream of said array, and positioned so that said shaped light beam strikes said output element, and where said illumination output element is an array of cells which optically allows only light of a certain brightness or greater to be passed, said illumination output element producing a shaped light beam based on only light beam parts that have been passed by said array of cells, and also by said illumination output element.

2. A lighting device as in claim 1, wherein said array of light controlling element is a DMD.

* * * * *